April 17, 1962  YOSHIMATSU OKUDA  3,029,806
SOLAR HOT WATER HEATER
Filed Oct. 31, 1960  3 Sheets-Sheet 1

INVENTOR
YOSHIMATSU OKUDA
BY
ATTORNEY

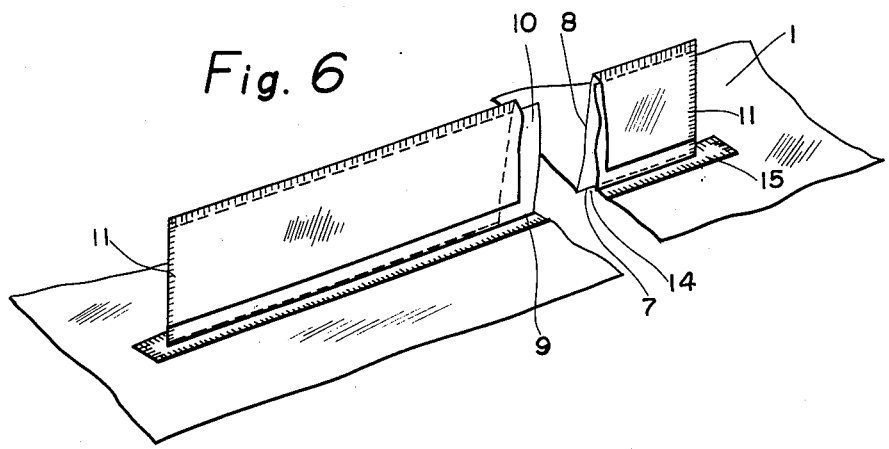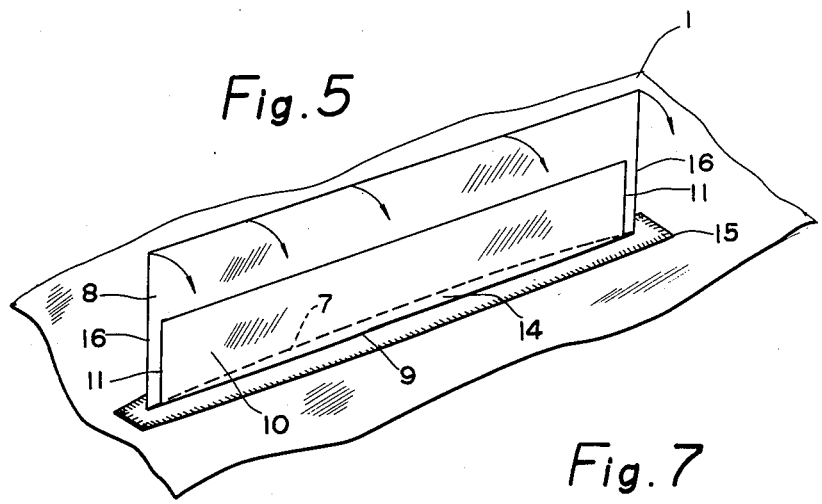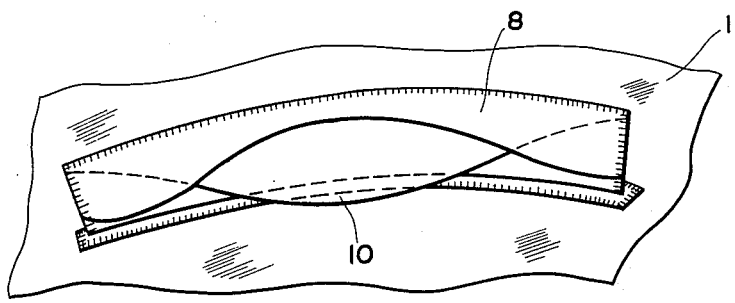

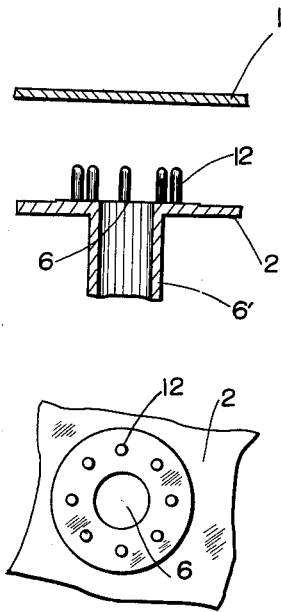
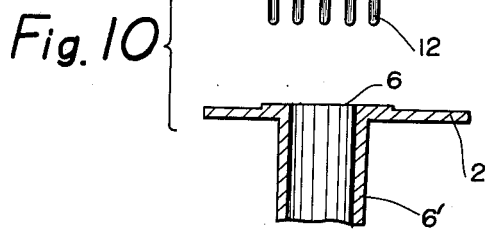
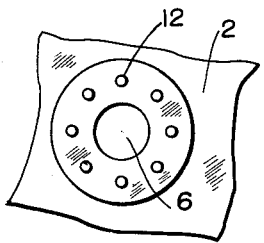
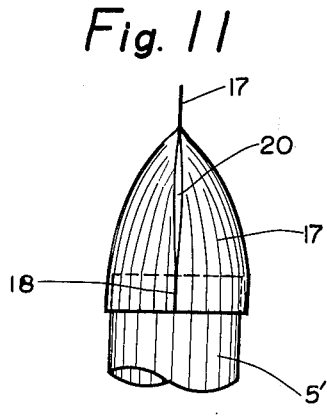
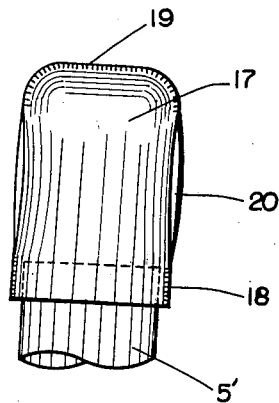

United States Patent Office 3,029,806
Patented Apr. 17, 1962

3,029,806
SOLAR HOT WATER HEATER
Yoshimatsu Okuda, 143 3-chome Koshienguchi,
Nishinomiya-shi, Hyogo-ken, Japan
Filed Oct. 31, 1960, Ser. No. 66,134
Claims priority, application Japan Dec. 30, 1959
2 Claims. (Cl. 126—271)

This invention relates to a solar heat hot water heater. Of the hot water heaters that are installed in the open and by utilizing the solar heat rays hot water is obtained, that is, a so-called solar hot water heater, the invention relates in particular to a novel solar hot water heater in which all of its members are constituted of a soft plastic, such as polyvinyl chloride, in which the special technical problems that arise from the uniqueness of the material used have been solved.

The solar hot water heaters that have been heretofore known are either those in which the interior surfaces of a tank made of wood or metal were painted black for absorbing the rays of the sun, to which glass covers were fitted, or those in which several pipes whose outside surfaces were painted black were connected together. These, however, were either heavy in weight and required for their installation much labor and a large amount of expense or had the defect as would permit the ready admittance of dust into the hot water.

An object of this invention is to provide a solar hot water heater from which such a defect as this of the conventional heaters has been removed, and which is light in weight as to be easily installed.

Another object of the invention is to provide a solar hot water heater made of soft plastic which is not just merely light in weight but has been reinforced such that it possesses sufficient strength to withstand the water pressure that is exerted when in use.

Still another object is the provision of a solar hot water heater made of soft plastic which possesses a structure capable of preventing the admittance of dust by making as small as possible that part in which the water is exposed to the atmosphere, while on the other hand, providing for means as will not prevent on account of the aforesaid structure the cleaning of the interior of the hot water heater.

A further object of the invention is to provide a solar hot water heater made of soft plastic in which a spacing means has been provided to ensure that the discharge of water is not stopped on account of the negative pressure that occurs in the vicinity of the water outlet during discharge of water.

In the accompanying drawings, a preferred embodiment of the invention is illustrated, wherein:

FIG. 5 is a perspective view of the construction of the opening for cleaning;

FIG. 6 is a perspective view showing the state wherein the opening for cleaning has been closed;

FIG. 7 is a perspective view showing the above opening in its opened state;

FIG. 8 is an enlarged fragmentary side elevation showing in detail the spacing means;

FIG. 9 is a top plan view of the above spacing means;

FIG. 10 is a side elevation illustrating a modification of said spacing means;

FIG. 11 is a side elevation of the overflow outlet cap; and

FIG. 12 is a front elevation of the above overflow outlet cap.

Figure 1:
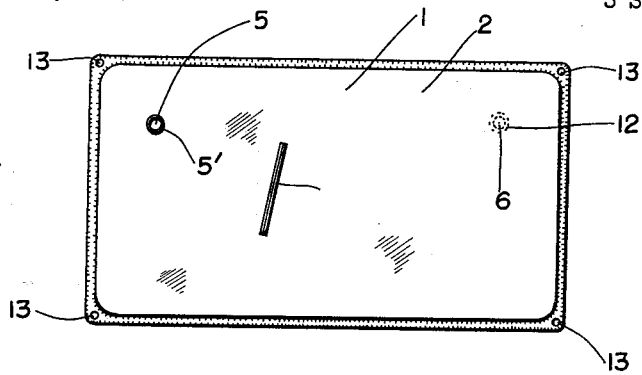
FIG. 1 is a top plan view of one example of a solar hot water heater in accordance with the present invention.
Figure 2:
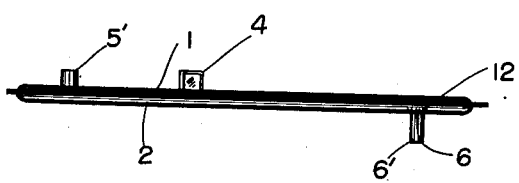
FIG. 2 is a side elevation thereof.
Figure 3:
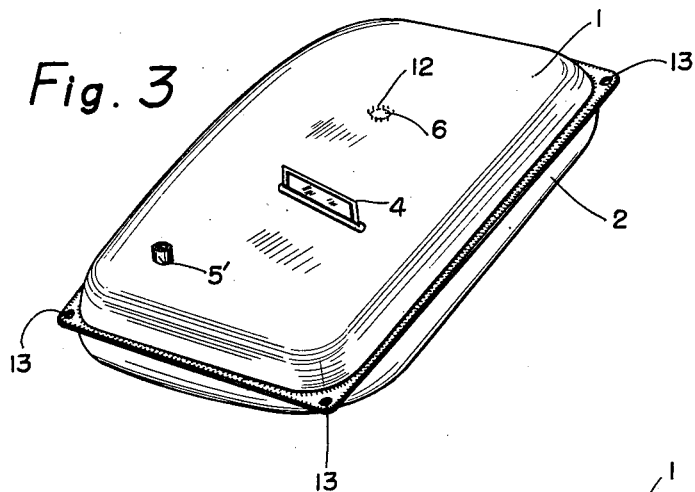
FIG. 3 is a perspective view of the hot water heater when filled with water.
Figure 4:
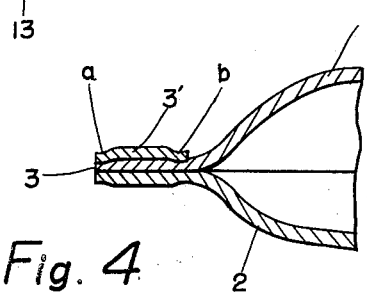
FIG. 4 is an enlarged sectional view showing in detail the sealed part.

Now, while referring to the drawings the present invention will be described. As shown in FIGS. 1 to 3, the solar hot water heater in accordance with this invention consists of a soft, transparent plastic top sheet 1 provided with an opening for cleaning 4 and an overflow outlet 5 and a bottom sheet 2 of a soft plastic, which is black in color, provided with a water supply and discharge port 6, which top and bottom sheets are sealed threefoldly at the perimetric edge 3. And as shown in FIG. 3 when water is supplied from the supply port 6 when being used, it swells up like a water pillow or a bag-shaped water tank. Since the sealed portion at the perimetric edge 3 is easily ruptured by water pressure, in the present invention, as shown in FIG. 4, the top sheet 1 and the bottom sheet 2 are placed one on top of the other and a strip-like sheet 3' is further superposed, and the thus three-deckered sheets are sealed together at points $a$ and $b$ by means of high frequency heat sealing. By thus doing, the thinning of the sheets during heat sealing is prevented, and the tank is reinforced along its entire perimeter. Needless to say, the top sheet 1 and the bottom sheet 2 must not only be such that they can withstand the water pressure but also must be capable of withstanding the heat of the sun as well as hot water. While for this purpose polyvinyl chloride is the most suitable material, those which consist of two or more sheets bonded together are still more suitable. The solar hot water heater of the present invention using such a material and having its perimeter three foldly sealed and reinforced as above can withstand a pressure of 0.7–0.8 atmosphere with the temperature of hot water at 50° C. Hence, there is no possibility of an accident occurring as a result of its bursting under normal conditions of use as a solar hot water heater. The holes 13 provided in the four corners are for passing ropes through for installing and securing the hot water heater.

The opening for cleaning 4 has been provided for the purpose of removing the slime and algoid growths that deposit and adhere to the inside surface of the bag-like water tank during its use over a long period of time. Thus it is possible to keep the tank clean at all times. The details of it are shown in FIGS. 5 to 7. As shown in FIG. 5, a slit 14 at least large enough to permit the entry of a hand is first made at a suitable location in substantially the middle part of the top sheet 1. And after having provided, if necessary, a reinforcing washer 15, a tongue piece 8 is attached to an edge 7 of the slit 14 and a tongue piece 10 to the other edge 9 thereof. The length of the tongue piece 8 is about 1.2 to 1.8 times that of the tongue piece 10. That portion of the tongue piece 8 in excess is folded over in the arrow direction, and both side edges 11 of the tongue 10 and both side edges 16 of the tongue 8 as well as the folded edge of the tongue piece 8 are heat sealed. Thus, as shown in FIG. 6, by the tongue piece 8 which extends from one edge 7 of the slit 14 assuming the form wherein it envelopes the tongue piece 10 extending from the other edge 9 in the bag-like portion formed by heat sealing of the folded over portion at its both side edges, the opening for cleaning 4 is constituted. Since the construction of the opening for cleaning of the hot water heater is as hereinabove described, it is readily opened by passing of the tongue piece 10 under the bag cover 8, and cleaning of the inside surface can be performed by inserting the hand from this opening.

In the top sheet 1 there is also provided an overflow outlet 5 at a suitable location. The overflow outlet 5 is for allowing the excess water to flow out from here when the bag-like water tank of the solar hot water heater of the present invention becomes full of water. As shown in FIGS. 1 to 3, a cylindrical tube 5' is attached here. By suitably regulating the length of this overflow tube 5' the amount of water that is to be put into the water tank may be regulated. There is however the possibility that dust might enter from this opening into the water tank as to contaminate or pollute the hot water. Hence, preferably a cap 17 such as is shown in FIGS. 11 and 12 should be provided. This cap 17 is made by superposing two sheets of soft plastic of the same material as that of the sheet 1 and heat sealing that part 18 which fits over the overflow tube 5' and also the summit part 19. By doing thus, that part which has not been heat sealed forms a slit 20 from which the excess water overflows.

In lieu of providing an overflow outlet such as above, it is possible to have the aforesaid opening for cleaning 4 perform also the function of an overflow outlet. Precisely, while the opening for cleaning is in its normal state maintained in a closed state as in FIG. 6, when the water tank becomes filled with water, on account of the pressure exerted it opens up naturally as in FIG. 7. Thus, it is seen that by opening up in this manner it can be utilized as an overflow outlet.

In the bottom sheet 2 there is provided a water supply and discharge port 6, which functions both as the supply inlet for supplying water to the water tank as well as the discharge outlet for the discharge of water therefrom. To this port, a water supply and discharge pipe 6' is connected. Instead of having one pipe performing both the functions of supplying as well as discharging water, it is possible to provide two. For example, a water supply inlet may be provided in the top sheet 1 separately from the discharge port, as described above.

Inasmuch as the hot water heater of the present invention is constituted of soft sheets, there is the tendency of the top sheet 1 being sucked towards the water discharge port 6 due to the negative pressure occurring in the vicinity of the water discharge port during discharge of water. Thus the discharge of water, in some cases, becomes impossible on account of the top and bottom sheets coming in close contact with each other. In order to remove such a trouble as this, in accordance with the present invention, a spacing means 12 may also be provided. In FIGS. 8 and 9 can be seen as this spacing means the provision of a number of verrucose projections 12 around the water discharge port 6 of the bottom sheet 2. On the other hand, in FIG. 10 verrucose projections 2 facing downwards are provided annularly in the top sheet in a location opposite the water discharge port 6. In either of these cases, even if a negative pressure does occur in the vicinity of the water discharge port 6 and the top sheet 1 is sucked towards the port, the coming into close adherence of the top and bottom sheets would be prevented, and thus it is apparent that the water discharge port will not be closed.

The spacing means is not to be limited to such verrucose projections as this, and any and all equivalents capable of producing the same results can all be used.

While I have shown and described a preferred embodiment of my invention, it will be understood that it is not to be limited to all of the details shown, but is capable of modification and variation within the spirit of the invention and within the scope of the claims.

What I claim is:

1. A solar hot water heater comprising a top sheet of soft, transparent plastic provided with a pocket-type opening for cleaning, said opening also serving as an overflow outlet, a bottom sheet of soft, black plastic provided with a tubular water supply and discharge port, said top and bottom sheets being superposed and further superposed along their perimeters with a reinforcing strip, said top and bottom sheets being heat sealed triply with said reinforcing strip along their said perimeters, the said pocket-type opening formed by providing a slit in said top sheet, attaching a short tongue piece to one side of said slit, and enveloping the same with a long tongue piece attached to the other side of said slit, and thereafter heat sealing the side edges of said tongue pieces to each other.

2. A solar hot water heater comprising a top sheet of soft, transparent plastic and a bottom sheet of soft, black plastic, said top and bottom sheets being superposed, the perimeters of said sheets being further superposed with a reinforcing strip and then being heat sealed triply, said top sheet being provided with a pocket-type opening for cleaning said heater, and a tubular overflow outlet, said outlet being covered with a cap, said bottom sheet being provided with a tubular water supply and discharge port, a slit in said top sheet, said pocket-type opening being formed by enveloping a short tongue piece attached to one edge of said slit with a long tongue piece attached to the other side of said slit, the respective two side edges of said tongue pieces being heat sealed to each other, and said cap being formed by superposing two soft plastic rectangular sheets and thereafter heat sealing the top edges and the bottom halves of the two side edges thereof, thereby forming slits for the overflow of water at the uper half of the two side edges of said cap.

References Cited in the file of this patent

UNITED STATES PATENTS

| 2,412,466 | Miller | Dec. 10, 1946 |
| 2,445,350 | Ginnings | July 20, 1948 |
| 2,659,516 | Smith | Nov. 17, 1953 |

FOREIGN PATENTS

| 840,926 | France | Jan. 28, 1939 |